Aug. 11, 1942.   J. C. MORROW   2,292,710
HAND LUBRICATOR
Filed May 25, 1940
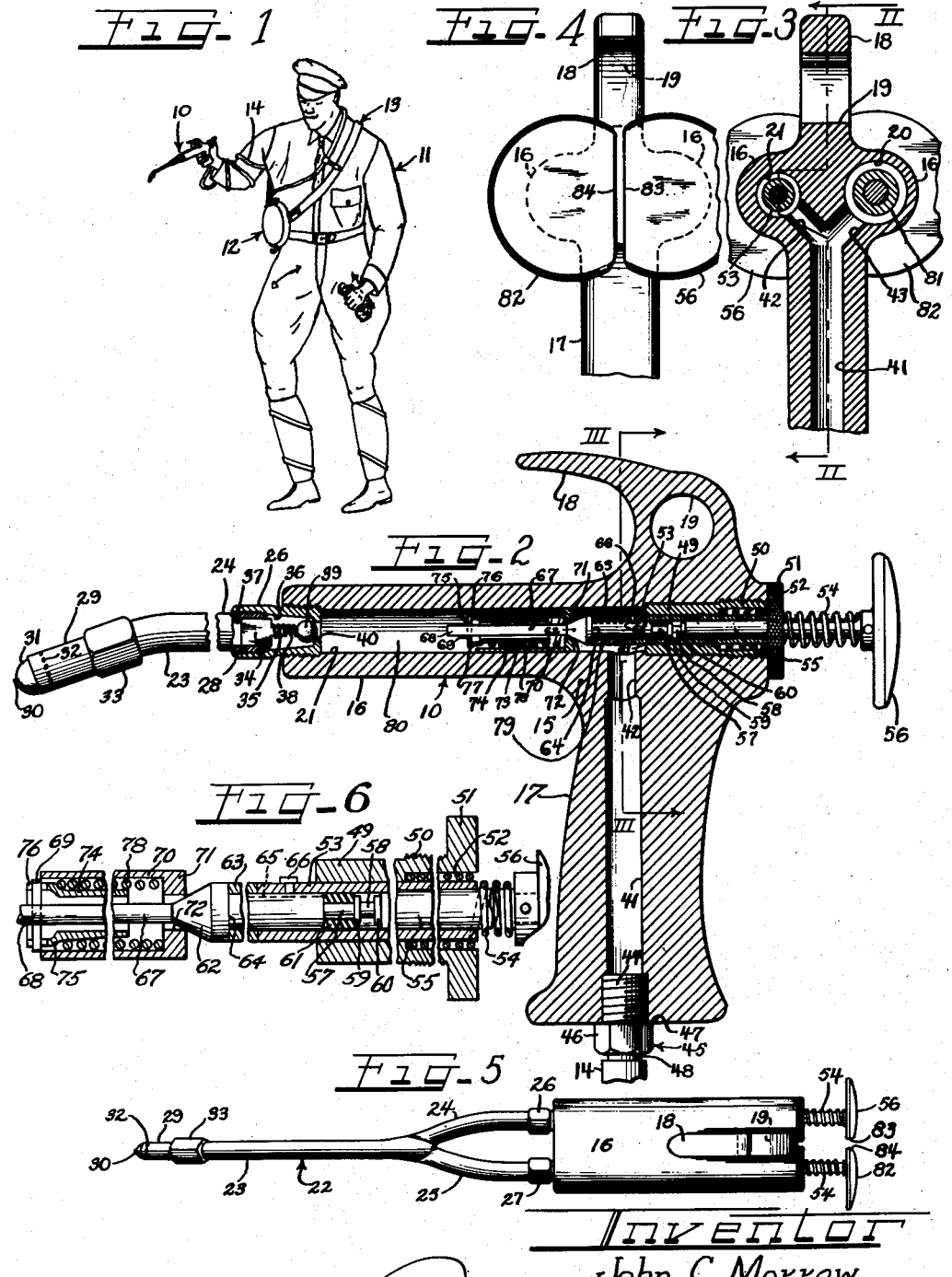
Inventor
John C. Morrow.
by Charles W. Neil Attys Patented Aug. 11, 1942

2,292,710

UNITED STATES PATENT OFFICE 2,292,710

HAND LUBRICATOR

John C. Morrow, Chicago, Ill., assignor to Morrow Lubricator Company, Chicago, Ill., a corporation of Illinois Application May 25, 1940, Serial No. 337,145

12 Claims. (Cl. 221—47)

The present invention relates to a high pressure hand lubricator and more particularly to a lubricator of the plunger type which is adapted for connection to a remote lubricant supply and from which it draws lubricant and ejects it under pressure when the plunger is manually operated.

The usual or present manually operated hand lubricator devices are arranged to be directly attached to a lubricant container, such as a can or cylinder. Such a combination self-contained appliance must necessarily be of light construction to enable an operator to carry the appliance when lubricating a device such as an automotive vehicle. This construction necessarily limits the size of the can or cylinder lubricant container thereby requiring the container to be frequently filled.

The device of the present invention is arranged for connection to a remote supply of lubricant to eliminate the foregoing objections.

It is therefore an object of the present invention to provide a lubricator device which may be attached to a remote supply of lubricant.

Another object of the present invention is to provide a novel hand lubricator device capable of forcibly ejecting lubricant under high or low pressures.

A further object of the present invention is to provide a multiple pressure hand lubricator device having connection to a movable or stationary remote supply of lubricant.

A still further object of the present invention is to provide a pump lubricator of such construction as to be carried and operated by but one of the operator's hands, and in addition, is so connected to a remote lubricant supply as to increase the operating range therefrom over similar lubricators in use at the present time.

The novel features believed to be characteristic of the present invention are set forth with particularity in the appended claims. The invention itself, however, both as to its organization and manner of construction, together with further objects and advantages thereof, may best be understood by reference to the following description taken in connection with the accompanying drawing, in which:

Figure 1 is a view illustrative of one of the ways in which the lubricating device embodying the principles of this invention is manually operated and connected to a remote source of lubricant;

Figure 2 is an enlarged longitudinal vertical cross-sectional view, with parts in elevation, of the lubricator device illustrated in Figure 1, as taken substantially along the plane indicated by the lines II—II of Figure 3;

Figure 3 is a fragmentary transverse vertical cross-sectional view taken substantially along the plane indicated by the line III—III of Figure 2;

Figure 4 is a fragmentary rear end elevational view of the device illustrated in Figure 2 as seen when looking toward the actuating thumb buttons;

Figure 5 is a reduced top plan view of the device illustrated in Figure 2 and

Figure 6 is an enlarged longitudinal cross sectional view of the valve structure shown in Figure 2.

As illustrated in Figure 1, the hand lubricator 10 is shown as being held by the right-hand of an operator 11 with his left-hand free for other uses, such for example as cleaning the parts of a vehicle to be lubricated.

As shown, lubricant is contained in the canteen-like container 12 which is suspended from a shoulder strap 13 and connected to the hand lubricator 10 by a flexible hose 14.

The device illustrated is but one of a number of modifications illustrative of the operation of the hand lubricator of this invention. If desired, the hand lubricator 10 may be connected to a large stationary lubricant container (not shown) by the flexible hose 14. When so connected, the range of operation of the hand lubricator is dependent upon the length of the flexible connecting hose and the ability of the hand lubricator to lift lubricant by suction from its container into its operating cylinders, as will be more fully described hereinafter.

The hand lubricator 10 includes a pistol-shaped body 15 having a barrel portion 16 and a grip 17 suitably shaped to be gripped by the fingers and palm of an operator. An upper fingerhold or grip 18 projects upwardly and forwardly from the rear end of the barrel portion for engagement by the index finger of the operator to better and more securely hold the lubricator device for operation. Metal is removed from the finger portion 18 to provide an aperture 19 for the purpose of reducing weight and for hanging the lubricator when not in use.

As best shown in Figures 2 and 3, the barrel 16 is provided with a pair of spaced parallel horizontally extending bores 20 and 21. The bore 20 is of larger diameter than the parallel bore 21 for a purpose to be more fully described hereinafter.

A wishbone-shaped spout 22 is connected to the forward end of the barrel 16, as illustrated in Figure 5. The spout 22 is shaped to provide a nozzle 23 and a U-shaped end formed by a pair of branches 24 and 25. A nipple 26 having one end exteriorly threaded is threaded into the threaded end of the small bore 21. A similar nipple 27 is threaded into the end of the larger bore 20.

As shown in Figure 2, the end of the branch 24 is exteriorly threaded at 28 to engage the interiorly threaded end of the nipple 26. Similarly, the branch 25 is connected to the nipple 27.

The extremity of the nozzle 23 is provided with a tip member 29 having an apertured pilot projection 30 for entrance into a lubricant fitting to center the nozzle. A rounded member 31 surrounds the pilot and is adapted to seat against and seal the connection between the tip and a lubricant fitting. If desired, the rounded member 31 may be formed of yieldable material which will compress when the tip is applied to a fitting to seal the connection between the tip and the fitting.

The tip member 29 can be indented at 32 to retain the rounded member 31 therein. The tip 29 has a polygonal portion 33, which is interiorly threaded to threadedly engage the extremity of the nozzle 23. The polygonal portion 33 is useful in receiving a tool for applying the tip to, or removing it from, the nozzle 23.

A flat plate 34, carrying a tapered point 35 which extends into the tapered portion 36 on the inside of the nipple 26, is frictionally retained within the bore 37 of the end of the branch 24.

A coil spring 38 is threaded about the point 35 and normally bears against a ball 39 which constitutes a check-valve arrangement. The ball 39 normally closes the reduced axially bore 40 provided at the forward end of the nipple 26.

A similar arrangement (not shown) is provided within the nipple 27 connecting the branch 25 to the enlarged bore 20.

A vertical passageway 41 is provided in the grip portion 17 and terminates at its upper extremity in an angular branch 42, communicating with the small bore 21, and an angular branch 43, communicating with the large bore 20. At its lower end, the passageway 41 is threaded to receive the threaded end 44 of a hose nipple 45. The nipple 45 is provided with a hexagonal portion 46 for receiving a tool for applying the nipple to the grip 17 whereby it is locked in place against the square shoulder 47. A smooth rod-like shank 48 is provided opposite the threaded end 44 around which the end of the hose 14 is positioned.

A sleeve 49, exteriorly threaded adjacent one end as at 50 and terminating in a knurled knob 51, is threadedly engaged within the rear end of the axial bore 21 with the knob 51 locked against the end face of the barrel 16. At its knobbed end, the sleeve 49 is provided with an enlarged bore 52.

A thin sleeve 53 is pressed into the internal bore of the sleeve 49 and extends beyond the forward end thereof, as shown in Figure 2. The recess provided between the opposite end of the sleeve 53 and the enlarged bore 52 provides a seat for a coil spring 54 whose purpose is more fully explained hereinafter.

A piston rod 55 extends through the inside bore of the sleeve 53 and terminates at one end in a portion to which is connected a thumb button 56. The coil spring 54 embraces the outer end of the piston rod 55 and abuts against the thumb button 56 to normally hold the thumb button in projected operative position.

The portion of the piston rod 55 which works within the sleeve 53 has portions 57 and 58 of restricted diameter, and other portions 59 and 60 of slightly greater diameter, but of less diameter than the diameter of the rod 55. A yieldable washer 61 surrounds the reduced portion 57 and is expansive against the bore of the sleeve 53 to prevent liquid discharge towards the rear end of the bore 21. However, should liquid such as lubricant escape by the washer 61, it becomes trapped within the recess formed by the reduced portion 58. The washer and its adjacent recess essentially seals the bore 21 against lubricant escape through its rear end when under pressure.

An enlarged tapered portion 62 is formed on the piston rod in inwardly spaced relation from its forward end. A spacer sleeve 63 abuts at one end against the sleeve 53 and at its inner end against the shoulder 64 provided at one end of the tapered portion 62.

A longitudinally extending slot 65 is provided on the piston rod portion between the shoulder 64 and the reduced portion 57. A pin 66 extends inwardly of the sleeve 53 to seat within the slot 65 to restrict the piston rod against rotative movement but allowing for limited endwise movement thereof.

The forward end of the piston rod 55 is shaped to provide a reduced round portion 67 which terminates at its free end in a square portion 68. A pin 69 is passed through a suitable aperture provided in the square end 68 and extends beyond the side surfaces thereof.

A piston valve 70 is carried within the bore 21 to have frictional sliding engagement therewith. The piston valve is hollow for a major portion of its length and terminates in a head 71 which is centrally apertured at 72 for normally engaging against the tapered portion 62 of the rod to close liquid communication through the piston valve.

A sleeve 73, having a reduced portion 74 for a major portion of its length, terminates at one end in an oval-shaped portion 75. Slots 76 and 77 are provided in the side walls of the end 75 across its shortest diameter to receive therein the extended ends of the pin 69. As shown in Figure 2, the inner end of the reduced portion 74 terminates short of the valve head 71. A coil spring 78 embraces the reduced portion 74 and is interposed between the valve head 71 and the oval-shaped end 75 to permit limited endwise movement between the piston valve 70 and the sleeve 73.

The coil spring 78 serves to normally maintain the piston valve head 71 in seated engagement with the tapered portion 62 of the piston rod 55.

An inlet chamber 79 is defined within the axial bore 21 between the inner end of the sleeve 49 and the head 71 of the piston valve 70. Similarly, an outlet chamber 80 is formed within the axial bore 21 between the piston valve and the inner valve end of the nipple 26. It is to be noted that the operative lengths of both the inlet and outlet chambers vary depending upon the position of the movable piston valve 70. As shown in Figure 2, the angular branch 42 connects the inlet chamber 79 and the vertical passageway 41. Similarly, the branch 43 connects the inlet chamber of the bore 20 and the passageway 41.

To operate the lubricator device described herein, the operator places his index finger about the finger grip 18, the palm of his hand against the rear or right-hand portion of the grip 17, and his other fingers about the forward portion of the grip, with his thumb available for actuating the thumb button 56.

By pressing forwardly against the thumb button 56, the piston rod 55 moves the piston valve 70 forwardly and creates a suction within the inlet chamber 79, thereby drawing lubricant from a container, such as the canteen 12, upwardly through the passageway 41. When the thumb button engages against the knurled knob 51, which defines the forward limit of movement of the piston valve 70, the operator releases pressure thereon and the spring 54 returns the thumb button to its normal projected position as shown in Figure 2. Engagement between the spacing sleeve 63, the shoulder 64 on the tapered portion 62, and the end of the sleeve 53 defines the limit of movement of the piston rod to the right. As the piston rod moves to the right, friction between the piston valve 70 and the axial bore 21, as well as reduced pressure or suction in the outlet chamber 80, caused by exhausting the chamber and then sealing it with the check ball 39, is sufficient to overcome compression of the coil spring 78, thereby disengaging the seated connection between the valve head 71 and the tapered portion 62. The gradual return to the right of the piston valve 70 creates a suction within the outlet chamber 80 and permits passage of the lubricant from within the inlet chamber to the outlet chamber. When the outlet chamber is substantially filled with lubricant the spring 78 will seat the head 71 against the tapered portion 62. When pressure is again applied against the thumb button 56, the lubricant trapped within the outlet chamber 80 is compressed by the piston valve 70 to overcome compression of the coil spring 38 within the nipple 26. The ball 39 then moves away from its obstructing position within the bore 40 to permit lubricant to flow under pressure from the outlet chamber through the spout 22.

It will be noted that the inward or power stroke of the piston rod 55 performs the double function of drawing lubricant into the inlet chamber from the lubricant container and compresses lubricant trapped within the outlet chamber to force it through the spout. The return stroke permits lubricant to flow from the inlet chamber to the outlet chamber, where it is ready for compression. By reciprocating the piston rod through the actuation of the thumb button 56, a pumping action takes place within the small bore 21.

As best shown in Figures 3 and 5, the arrangement of parts within the larger axial bore 20 is exactly the same as the arrangement within the smaller bore 21 with the exception that the parts are sufficiently large to seat within the enlarged bore. As shown in Figure 3, the sleeve 53 is smaller in diameter than the corresponding sleeve 81 provided in the bore 20. The other parts are shaped proportionately and in the same manner as those shown in Figure 2.

As shown in Figure 5, the piston rod within the larger bore 20 is actuated by a thumb button 82.

Both of the thumb buttons 56 and 82 are D-shaped in end elevation and are positioned with their flat edges 83 and 84 in spaced opposed relation, as illustrated in Figure 4. This spaced opposed relationship is maintained by the coaction between the pin 66 and the longitudinal slot 65 formed in each of the piston rods.

It is evident from the size of the bores 20 and 21 that the actuation of the respective sized piston valves will result in a difference of pressures and quantities of lubricants ejected therefrom. The axial bore 21 being smaller, a smaller quantity of lubricant under less pressure will be ejected therefrom than from the larger bore 20.

By positioning the thumb buttons 56 and 82 in closely adjacent relationship, the operator is able to actuate either one or both by the thumb of his right-hand. Obviously, variable pressures and quantities of lubricant from either size ejector or from a combination of both may be obtained.

While a particular embodiment only of this invention has been illustrated, it will, of course, be understood that the invention should not be limited thereto, since many modifications may be made and, therefore, it is contemplated by the appended claims to cover all such modifications as fall within the true spirit and scope of the present invention.

I claim as my invention:

1. A lubricant gun comprising a body having a plurality of bores therein and passageways connecting said bores to each other and to a source of lubricant, and a pump in each of said bores, each of said pumps having a reciprocable piston rod with an intermediate enlarged tapered portion, a cup-shaped piston having a bore through the end wall thereof for receiving said piston rod therethrough and defining a seat for the tapered portion of said piston rod, a sleeve having an enlarged end and a reduced end within said piston, means connecting the enlarged end of said sleeve and said piston rod, and spring means embracing the reduced end of said sleeve and being seated between the enlarged end of the sleeve and the end wall of said piston.

2. A lubricant gun comprising a housing having a plurality of different sized cylinder bores therein and passageways connecting said bores to each other and to a source of lubricant, a suction and ejection pump in each bore, each pump having a piston rod with an intermediate tapered portion and rod portions of reduced size extending away therefrom, one of said reduced rod portions extending outwardly beyond said housing, spring means normally maintaining said one rod portion in said extended position, a cup-shaped cylindrical piston around the other of said reduced rod portions having an apertured end wall defining a seat for the tapered portion on said piston rod, and spring means having one end connected to the free end of said other reduced rod portion and its other end seated against the end wall of said piston for normally seating the latter on said tapered portion of the piston rod.

3. In a multi-pressure lubricating pump adapted for connection to a remote lubricant source and to be held and operated by one of an operator's hands, the improvements which comprise a body having axial bores therethrough defining cylinders, one of said cylinders having a diameter greater than the diameter of the other cylinder, said body having an intercommunicating conduit between said cylinders and said lubricant source, an ejector spout connecting adjacent ends of said cylinders, a reciprocable piston in each cylinder dividing the cylinder into a suction chamber between one end of the piston and said intercommunicating conduit and a discharge chamber between the other end of the piston and said ejector spout, means for independently and simultaneously actuating each of said pistons manually in one direction, spring means urging said first means and each of said pistons in the opposite direction, and valve means in each cylinder between the piston therein and said first means for holding the discharge chamber out of flow communication with said suction chamber when said piston is manually moved in said one direction and effecting flow communication between said chambers when said spring means moves said piston in said opposite direction.

4. A lubricant gun comprising a body having a plurality of bores therein and passageways connecting said bores to each other and to a source of lubricant, a suction and ejection pump in each bore, means for manually actuating said pumps in one direction, means for moving said pumps in the opposite direction, means for by-passing lubricant through said pumps when moved in one of said directions, an ejector spout having a single discharge end and branches extending away therefrom in diverged relation and being connected to said bores, and check valves in said branches.

5. In a multi-pressure lubricating pump adapted for connection to a remote lubricant source and to be held and operated by one of an operator's hands, the improvement which comprises a body having a pair of axial bores therethrough defining liquid cylinders, said cylinders having different diameters and an intercommunicating conduit connected to said lubricant source, an ejector spout having a single passageway at one end and a double passageway at its other end for connection to said cylinders, a spring pressed ball in each passageway connected to said cylinders and normally closing said ejector spout against liquid flow, a cup-shaped piston valve in each cylinder movable therein towards and away from said first valves, each of said piston valves having an axial port at one end and defining in its respective cylinder an inlet chamber on the inter-communicating conduit side and an outlet chamber on the spring pressed ball side, a piston rod in each cylinder having a tapered portion adjacent its inner end extending into said axial port for closing said port when said rod is moved toward said spring pressed ball, a spring between the inner end of each piston rod and each cup-shaped valve for normally holding the latter against said tapered portion, means for holding said piston rods against rotation and permitting endwise movement thereof, a thumb button at the outer end of each of said piston rods for independently moving either piston rod inwardly of its respective cylinder, and spring means for independently urging each of said thumb buttons in the opposite direction for moving said piston rods in a projected position, each of said piston valves when moved inwardly creating suction on one side for drawing lubricant from a container into its inlet chamber and for compressing lubricant trapped in its outlet chamber to urge said spring pressed ball in an opening direction to permit lubricant to flow through said spout, each of said thumb button springs then becoming effective to move its piston rod in the opposite direction, each of said piston valves snugly fitting its cylinder so as to lag behind said rod when moved in said opposite direction to displace said valve with respect to said rod and open its axial port for lubricant flow from said inlet chamber to said outlet chamber, said lubricant being ejected through said spout from a single cylinder or from both cylinders simultaneously.

6. A pistol-shaped body for a hand lubricator comprising a barrel having a plurality of spaced parallel bores extending longitudinally therethrough, an intercommunicating conduit between said bores, a hand grip on said barrel extending in substantially right-angular relationship to the axes of said bores, a passageway in said hand grip terminating in said intercommunicating conduit, and a second grip on said barrel opposite said hand grip and extending upwardly and forwardly for engagement by the index finger of an operator.

7. A pump for a hand lubricator comprising a reciprocable piston rod having an intermediate enlarged tapered portion, a cylindrical piston having a wall at one end, an axial bore in said wall for receiving said piston rod therethrough and defining a seat for the tapered portion of said piston rod, a cylindrical member having an enlarged end portion and a reduced end portion being positioned within said cylindrical piston, a slot in said enlarged end, a pin extending through said piston rod and seated within said slot, and a coil spring within said cylindrical piston and embracing the reduced end portion of said cylindrical member between its enlarged end portion and the end wall of said cylindrical piston.

8. A pump for a hand lubricator comprising a reciprocable piston rod having an enlarged portion defining a shoulder, a sleeve slidably receiving said piston rod therethrough with one end defining an abutment for said shoulder, an axially extending slot in a portion of said piston rod, a pin in said sleeve having a portion extending into said slot for limiting relative movement between said piston rod and said sleeve when the shoulder is moved away from said one end of the sleeve, and means adjacent said slotted portion of said piston rod for fluid sealing said relatively movable rod and sleeve.

9. A pump for a hand lubricator comprising a reciprocable piston rod, a stationary sleeve embracing said rod, means limiting the movements of said rod relative to the sleeve, adjacent reduced portions on an intermediate portion of said piston rod, a collar separating said reduced portions, and a resilient washer seated in one of said reduced portions and being expansible against the inner surface of said sleeve for sealing the sleeve against lubricant seepage, the other of said reduced portions defining a trap for any lubricant seeping by said resilient washer.

10. A wish-bone ejector spout for a multi-cylinder hand lubricator comprising a hollow discharge nozzle, a removable lubricant fitting at one end of said nozzle, a pair of hollow branches connected at their convergent ends to the other end of said nozzle and extending away therefrom in diverged relation, a nipple at each of the diverged ends of said branches for connection to a cylinder in said lubricator, and check valve means between each diverged end of said branches and the nipple thereon.

11. An ejector spout for a multi-cylinder hand lubricator comprising a hollow discharge nozzle, a removable lubricant fitting at one end of said nozzle, a plurality of hollow branches connected at their convergent ends to the other end of said nozzle and extending away therefrom in diverged relation, a hollow nipple at each of the diverged ends of said branches for connection to a cylinder of said lubricator, an end wall at the free end of said nipple, an axial bore through said end wall defining a seat, a flat plate pressed into the nipple end of each branch, a lug on said plate, a coil spring carried at one end by said lug, and a ball normally maintained seated against the axial bore in said nipple end wall by the other end of said coil spring.

12. A pump construction comprising a reciprocable piston rod having an intermediate portion formed as a valve, a cup-shaped piston having a bore through its end wall for receiving said piston rod therethrough and defining a seat for said valve, a coil spring embracing said piston rod within said piston, and means connected to said piston rod for seating one end of said coil spring thereon with the other end of said spring being seated against the end wall of said piston.

JOHN C. MORROW.